Nov. 30, 1954  D. W. WAGNER  2,695,443
METHOD OF MAKING CAPACITORS
Filed April 19, 1950
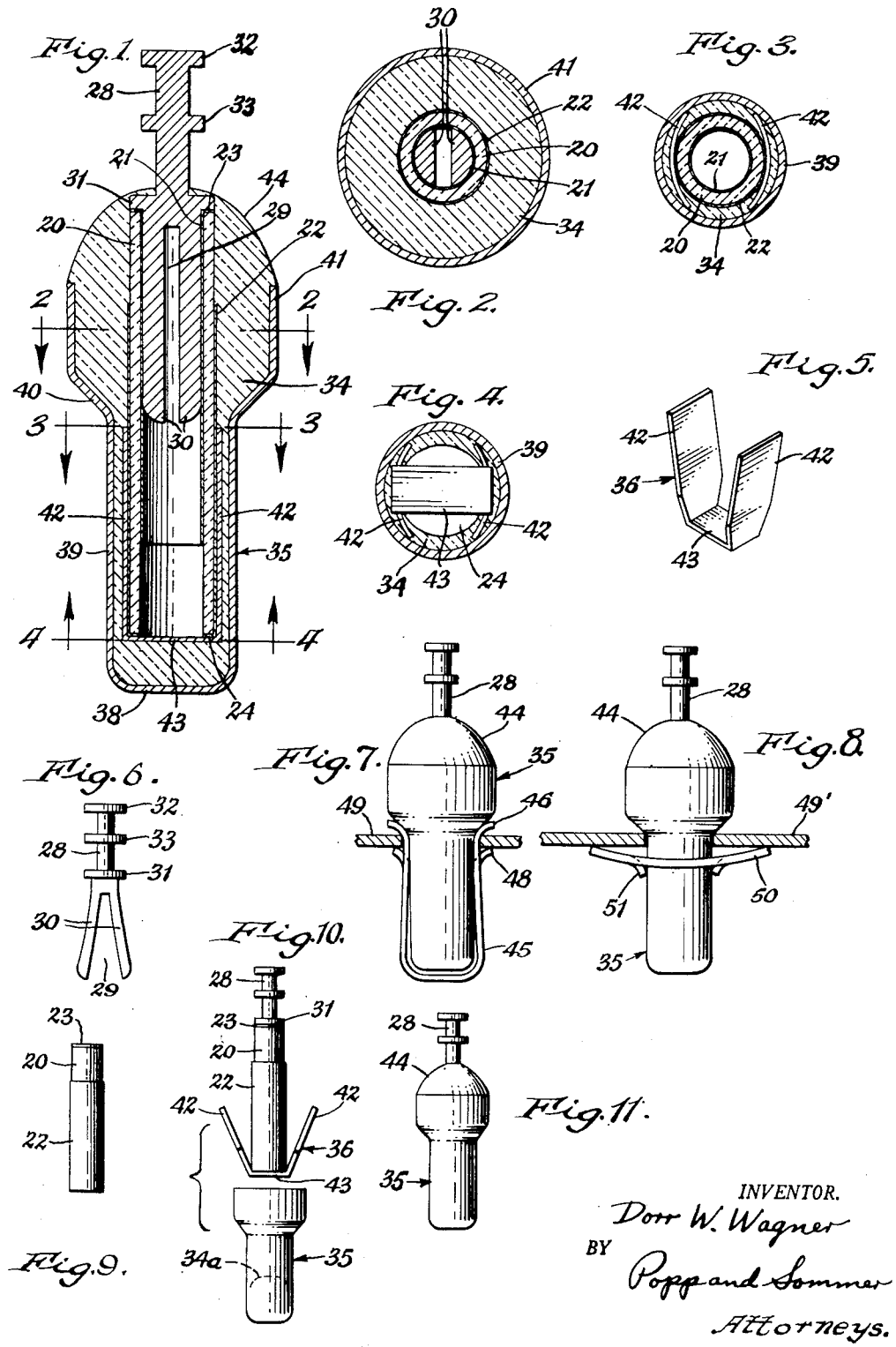
INVENTOR.
Dorr W. Wagner
BY Popp and Sommer
Attorneys.

Patented Nov. 30, 1954

2,695,443

METHOD OF MAKING CAPACITORS

Dorr W. Wagner, Franklinville, N. Y., assignor, by mesne assignments, to Aerovox Corporation, New Bedford, Mass., a corporation of Massachusetts Application April 19, 1950, Serial No. 156,747

2 Claims. (Cl. 29—25.42)

This invention relates to a capacitor and method of making the same and more particularly to a metal clad stand-off capacitor of the type in which two conductive electrodes are secured to the inner and outer surfaces of a relatively thin tube of refractory dielectric material having a high dielectric constant.

By stand-off capacitor is meant a capacitor having a rigid part thereof adapted for mounting on a panel such as the chassis or common ground of an electronic apparatus so that the body of the capacitor is supported in a position substantially perpendicular to said panel.

Solid titanate dielectric body layers for use in capacitors are made by more or less standard ceramic manufacturing procedures, and all such body layers are in the form of polygranular refractory structures in which the crystal structure of the grains have random orientation.

In many low voltage applications, it is of great importance to obtain with a capacitor of a given size, a maximum capacity effect. The maximum capacity is obtained by decreasing the thickness of the solid dielectric layer to a minimum. However, refractory titanate capacitor dielectric layers, when made in thin layers, are extremely fragile. For this reason, practical capacitors of the general stand-off type, having no additional strength and rigidity, exhibit a poor mechanical strength and are easily broken and otherwise rendered useless.

It is therefore one of the principal objects of the present invention to provide a stand-off capacitor which while having an inherently fragile dielectric body, is strong, and durable in construction and capable of withstanding abusive treatment without breakage.

Another object is to provide such a stand-off capacitor which can be mounted on its support quickly thereby permitting of high speed production of electronic units incorporating such capacitors.

Another object is to provide such a stand-off capacitor which has sturdy terminals projecting from its opposite ends, one of which terminals is adapted to be mounted on the support for the capacitor and the other terminal being adapted for connection with a wire with which the capacitor is to be used.

Another object is to provide such a stand-off capacitor which is effectively sealed for protection against humidity and temperature changes.

Another object is to provide such a stand-off capacitor which can be produced at low cost.

Other objects and advantages of the invention will be apparent from the following detailed description and accompanying drawing wherein:

Fig. 1 is a vertical central sectional view through a stand-off capacitor made in accordance with and embodying the present invention.

Figs. 2, 3 and 4 are horizontal transverse sectional views thereof taken on the correspondingly numbered lines in Fig. 1.

Fig. 5 is a perspective elevational view, on a reduced scale, of the contact and centering spring forming an element of the capacitor shown in Fig. 1.

Fig. 6 is a side elevational view, on a reduced scale, of the terminal post forming an element of the capacitor shown in Fig. 1.

Figs. 7 and 8 are side elevational views of the stand-off capacitor and illustrating two different ways of mounting the same on a supporting panel.

Figs. 9, 10 and 11 are diminutive side elevational views of the stand-off capacitor during progressive stages of its manufacture; Fig. 9 showing the dielectric cylinder which carries the conductive plates or electrodes of the capacitor; Fig. 10 showing the terminal post applied to one end of the dielectric cylinder and the contact and centering spring arranged on the opposite end thereof and this assembly ready to be inserted into a metal casing containing a predetermined amount of a thermosetting plastic material; and Fig. 11 showing the finished capacitor after the assembly of the parts shown in Fig. 10.

The stand-off capacitor shown in the drawings was primarily designed as a capacitor for use in television receivers and the like and hence is shown in greatly enlarged size although it can be made of any desired size or capacity.

The capacitor is shown as comprising a thin solid walled cylindrical dielectric tube or core 20, composed essentially of a refractory ceramic material having a high dielectric constant such as a titanate. To the surfaces of this dielectric tube 20 are united inner and outer extended surface electrodes represented by the the numerals 21 and 22 respectively. Each surface electrode 21 and 22 is in the form of an extremely thin layer or coat of conductive material, such as a silver composition, which has the properties of becoming bonded and united in extremely intimate and direct contact with the underlying exposed surface particles of the dielectric tube 20. The inner electrode 21 is shown as being in the form of a continuous cylindrical plate arranged on the inner peripheral surface of the dielectric tube 20 and having at its upper end an integral laterally outwardly extending continuous flat end section 23 which is arranged on the upper end face of the dielectric tube. The lower end of the inner electrode 21 terminates short of the lower end of the dielectric tube 20. Similarly, the outer electrode 22 is shown as being in the form of a continuous cylindrical plate arranged on the outer peripheral surface of the dielectric tube 20 and having at its lower end an integral laterally inwardly extending continuous flat end section 24 which is arranged on the lower end face of the dielectric tube. The upper end of the outer electrode 22 terminates short of the upper end of the dielectric tube 20.

It will thus be seen that the cylindrical plate sections of the inner and outer electrodes 21 and 22 respectively are arranged in spaced relation to each other with the intermediate body portion of the dielectric tube 20 disposed therebetween. Also, these cylindrical plate sections overlap each other and the degree of overlapping determines the capacity of the capacitor. This degree or area of overlapping can be varied as desired by shortening or lengthening the axial lengths of the cylindrical plate sections of the electrodes 21 and 22 thereby to provide the capacitive effect desired.

A terminal is provided for the inner electrode 21 and this is shown as comprising a solid conductive metal post or stem 28 having one end portion arranged within the dielectric tube 20 in contact with the inner electrode 21 and the other end portion projecting outwardly from the dielectric tube 20. Referring to Fig. 6, the insertable end portion of the terminal post or stem 28 is shown as cylindrical and centrally slit a substantial portion of its axial length as indicated at 29 to provide a pair of contact fingers 30—30. The lower outer edges of these contact fingers 30 are preferably rounded as shown. Adjacent the upper or inner end of the slit 29, the terminal post or stem 28 is formed to provide an integral outwardly projecting continuous annular collar 31 the lower face of which is adapted to seat on the end section 23 of the inner electrode 21 as shown in Fig. 1. The protruding portion of the terminal post or stem 28 is also shown as provided with a pair of integral outwardly projecting continuous annular collars 32 and 33. Collar 32 is arranged at the outer extremity of the terminal post or stem 28 and collar 33 is arranged intermediate the collars 31 and 32. The protruding portion of the terminal post or stem 28 provides a rigid sturdy tie post and the collars 32 and 33 are adapted to receive a conventional type of snap-on connector (not shown), if desired.

In order to mount the terminal post or stem 28 on the dielectric tube 20, the contact fingers 30 which were spread apart slightly in manufacture as shown in Fig. 6 are pinched together and their lower rounded ends are inserted into the bore of the dielectric tube, after which the terminal post or stem is pushed inwardly until the inner collar 31 seats on the end section 23 of the inner electrode. It will be seen that the peripheral surfaces of the contact fingers 30 engage the inner surface of the inner electrode 21 and these fingers are constantly urged outwardly into firm frictional and hence electrical contact with the inner electrode. The lower rounded edges of the contact fingers 30 prevent scraping off the inner electrode during insertion of these fingers into the dielectric tube 20.

The dielectric tube 20 with the terminal post or stem 28 arranged thereon is embedded in a thermo-setting plastic material 34 held in a metal cup member 35. Electrical and mechanical contact is made between the outer electrode 22 on the dielectric tube 20 and the inner surface of the cup member 35 by a contact and centering spring member 36.

The metal cup member 35 comprises an end wall or bottom 38 from which rises a narrow cylindrical wall portion 39 which flares outwardly and upwardly as indicated at 40 to join with a cylindrical wall portion 41 of larger diameter than the portion 39. This cup member is preferably formed as an integral part.

Referring to Fig. 5, the construction of the contact and centering spring member 36 before insertion into the casing or cup member 35 is shown. As there shown, the spring member 36 comprises a pair of spaced divergent rectangular flat wings 42—42 having their closer ends connected by a flat web 43. The spring member 36 is preferably made by bending the same into the shape shown in Fig. 5 from a single piece of conductive sheet metal which is relatively thin and compliant.

When in its assembled operative position the web 43 of the spring member 36 engages the end section 24 of the outer electrode 22 and also covers the opening at the lower end of the dielectric tube as shown in Figs. 1 and 4 to prevent the plastic compound 34 from entering therein. The web 43 is of a length, that is in the direction perpendicular to the wings 42, which is substantially equal to the diameter of the outer peripheral surface of the outer electrode 22. Also the wings 42 curve around diametrically opposite sides of the outer electrode 22, the central portion of each wing along its full height directly engaging the opposing surface portion of the outer electrode and the vertical edges of the wings engaging the inner surface of the cylindrical wall portion 39 of the casing or cup member 35, as shown in Fig. 3. The spring member 36 thus electrically connects the outer electrode 22 with the casing or cup member 35, the latter serving as the terminal for this electrode.

The thermo-setting plastic material 34 fills the cup member, surrounding all the parts therein and exhibits a convex meniscus property providing a generally parabolically shaped structure about the upper portion of the dielectric tube which projects from the casing or cup member 35 and also about the terminal post or stem 28, as indicated at 44 in Fig. 1. The convex meniscus portion 44 of the thermo-setting plastic body provides a considerable increase in strength and resistance to lateral thrust in respect to the longitudinal axis of the dielectric tube 20 and also provides an insulating stand-off effect which reduces the possibilities of connecting leads from associated electrical parts contacting the surface of the metal cup member 35, thereby shorting the capacitor.

The completely fabricated capacitor structure described above permits bypass capacitances to be rapidly installed on a chassis, thereby saving much time in producing electrical equipment under present day high production demands.

Two examples of mounting the stand-off capacitor on a chassis are illustrated in Figs. 7 and 8. Referring to Fig. 7 the capacitor is shown as having the lower relatively narrow cylindrical part of its casing 35 arranged in a conventional metal spring clip 45 having outwardly turned upper and lower ears 46 and 48 respectively arranged on opposite side of the chassis plate 49, this clip being arranged in a hole in the chassis plate. The flared part 40 of the cup member or casing 35 seats on the upper ears 46. This type of spring clip 45 provides a contacting pressure in a radial direction in respect to the longitudinal axis of the cup member and the chassis plate 49.

Referring to Fig. 8, the capacitor is shown as having been pushed through a hole in the chassis plate 49¹ and through the opening of a conventional spring type clip 50 commonly designated as a push on lock element. The clip 50 is shown as arcuate in form having its outer edge engaging the underside of the chassis plate and also having downwardly turned fingers 51 preferably struck out from the body of the clip. The edges of these fingers 51 tend to dig into the metal casing or cup member 35. This type of clip 50 provides an axial direction of contacting pressure between the cup member 35 and chassis plate 49¹.

Any other suitable manner of mounting the stand-off capacitor may be employed.

In the practice of the present invention the method of making the capacitor as above described is as follows:

The dielectric tube or core 20 is composed essentially of barium titanate and is preferably made by extruding a tube of the granular ceramic insulating material and a quantity of combustible organic binder, such as 90% by weight of ceramic material, mixed with a suspension material such as toluol and cellulose acetate. After drying the extruded dielectric tube is placed in a kiln and fired in accordance with standard practices to burn out the organic binder and mature the ceramic property.

After firing, the ceramic tube 20 is cut to the length desired, coated with the inner and outer surface electrodes 21 and 22 by brushing on a thin film of a mixture containing finely divided metallic silver and a ceramic frit, and subjected to an additional firing of at least 700° C., thereby to provide the article shown in Fig. 9.

The terminal post or stem 28 is then inserted into one end of the dielectric tube 20 so that the contact fingers 30 engage the inner electrode 21, and the contact and centering spring member 36 is placed over the outside of the opposite end of the dielectric tube 20, as shown in Fig. 10. Since the contact fingers 30 are normally slightly spread apart, they are pinched together to permit them to enter the bore of the dielectric tube. This assembly is then forced into the cup member 35 which contains a proper predetermined amount of thermo-setting plastic material as indicated at 34a in Fig. 10. As the spring member 36 enters the lower narrow part 39 of the cup member 35, the wings 42 are forced toward each other to closely embrace the outer surface electrode 22 and at the same time these wings are bowed or curved so that their outer edges engage the wall 39 of the cup member. Since the spring member 36 is symmetrical it will be seen that its wings 42 serve to center the dielectric tube 20 with respect to the casing or cup member 35.

As the insert assembly is pushed into the casing or cup member 35, the plastic material therein is displaced and caused to flow upwardly to embed the inserted parts as shown and also to produce the convex meniscus effect indicated at 44. It will be noted that the collar 31 on the terminal post or stem 28 covers the upper end of the dielectric tube 20 and the web 43 of the spring member 36 covers the lower end thereof, thereby excluding the plastic material from the interior of the dielectric tube 20. The completed assembled capacitor is thereafter subjected to a suitable temperature for a sufficient period to properly cure the thermo-setting plastic material.

From the foregoing it will be seen that the present invention provides a stand-off capacitor which is so constructed as to protect its inherently fragile dielectric tube; which can be readily installed; which is simple in construction and inexpensive to manufacture.

I claim:

1. The method of making a capacitor, which comprises applying surface electrodes to the inner and outer surfaces of a tube of dielectric material, partially inserting a terminal post into one end of said tube so as to mechanically and electrically engage said inner electrode, applying a contact and centering spring member to the other end of said tube, the said other end of said tube being covered by the web of said spring member from opposite sides of which a pair of outwardly divergent wings extend, partially inserting this assembly into a cup member containing a predetermined amount of thermo-setting plastic material whereby said wings are forced into physically resilient contact with said outer electrode and said cup member and said wings serving to center the tube assembly as it is inserted into said cup member, the thermo-setting plastic material being displaced by said tube assembly and producing a convex meniscus effect across the mouth of said cup member, and heating the completely assembled capacitor to cure the thermo-setting plastic material.

2. The method of making a stand-off capacitor, which comprises applying surface electrodes to the inner and outer surfaces of a thin walled tube of dielectric material, compressing the resilient split end of a solid metal terminal post and inserting the same into one end of said tube, partially inserting the other end of said tube into a metal cup member containing a predetermined amount of thermo-setting plastic material with a generally U-shaped contact and centering member covering the inserted end of said tube, the sides of said U-shaped member serving to center said tube as it moves into said cup member and being forced into physically resilient contact with both said outer electrode on said tube and said cup member, the thermo-setting plastic material being displaced by the inserted parts but being excluded from the interior of said tube and producing a convex meniscus effect across the mouth of said cup member, and heating the completely assembled capacitor to cure the thermo-setting plastic material.

References Cited in the file of this patent

UNITED STATES PATENTS

| Number | Name | Date |
|---|---|---|
| 1,354,146 | Thomas | Sept. 28, 1920 |
| 1,599,859 | Wilson et al. | Sept. 14, 1926 |
| 2,129,008 | Kater | Sept. 6, 1938 |
| 2,161,888 | Rearick | June 13, 1939 |
| 2,421,780 | Frear | June 10, 1947 |
| 2,464,377 | Cohen | Mar. 15, 1949 |
| 2,492,742 | Grasheim | Dec. 27, 1949 |
| 2,531,389 | Brandt | Nov. 28, 1950 |
| 2,665,376 | Kodama | Jan. 5, 1954 |

FOREIGN PATENTS

| Number | Country | Date |
|---|---|---|
| 583,493 | Great Britain | Dec. 19, 1946 |
| 590,753 | France | June 23, 1925 |